(12) United States Patent
Knowles et al.

(10) Patent No.: US 7,734,494 B2
(45) Date of Patent: Jun. 8, 2010

(54) VIRTUAL PROCUREMENT FOLDER

(75) Inventors: Deric Blair Knowles, Deep River (CA); David Ira Denenberg, Centreville, VA (US)

(73) Assignee: CGI Technologies and Solutions Inc., Fairfax, VA (US)

(*) Notice: Subject to any disclaimer, the term of this patent is extended or adjusted under 35 U.S.C. 154(b) by 879 days.

(21) Appl. No.: 11/210,887

(22) Filed: Aug. 25, 2005

(65) Prior Publication Data

US 2005/0283407 A1 Dec. 22, 2005

Related U.S. Application Data

(62) Division of application No. 09/741,823, filed on Dec. 22, 2000, now abandoned.

(51) Int. Cl.
G06Q 40/00 (2006.01)
(52) U.S. Cl. ............................................. 705/8; 705/26
(58) Field of Classification Search .................... 705/1, 705/26, 8
See application file for complete search history.

(56) References Cited

U.S. PATENT DOCUMENTS

| | | | |
|---|---|---|---|
| 5,319,542 A | 6/1994 | King, Jr. et al. | |
| 5,361,199 A | 11/1994 | Shoquist et al. | ............... 705/26 |
| 6,055,516 A | 4/2000 | Johnson et al. | |
| 6,115,690 A | 9/2000 | Wong | |
| 6,738,746 B1* | 5/2004 | Barnard et al. | .................. 705/7 |
| 6,816,865 B2 | 11/2004 | O'Brien et al. | ............. 707/100 |
| 7,155,403 B2* | 12/2006 | Cirulli et al. | ................... 705/17 |
| 7,249,250 B1* | 7/2007 | Akasaka et al. | ................. 713/1 |
| 2001/0049654 A1* | 12/2001 | Cecchetti et al. | .............. 705/38 |
| 2005/0283410 A1* | 12/2005 | Gosko | .......................... 705/27 |

FOREIGN PATENT DOCUMENTS

WO WO 00/21012 4/2000

OTHER PUBLICATIONS

Date, Shruti. Archives agency chooses a system to get up to speed on procurement. Government Computer News. Aug. 9, 1999 v18 i25 p. 12.
GSA Adopts NIC Commerce's Quote Module as Core Component of GSA Advantage Gov. Federal Computer Market Report. May 8, 2000 v24 i9 p. 7.
Moad, Jeff. Los Alamos Labs is counting on its Java-based intranet procurement project to translate into major savings. PC Week. Sep. 1, 1997 v14 n37 p. 1(2).
Jackson, William. HHS tries buying on the Web. Government Computer News. Sep. 8, 1997 v16 n27 p. 65(2).
Making Sense of the Intrenet Procurement Market. Inter@ctive Week. Oct. 4, 1999 v6 i41 ps-7.
Gilbert, Alonie: Create Purchase Orders and Checks on Them via the Web—Supplyworks System to Eleiminate Manual Processing of Purchase Orders. Information Week, May 1, 2000 p. 131.
Gonsalves, Antone: Supply Works meets procurement needs—myLoudcloud helps users avert stormy weather with fast, online access to performance tools. EWeek, May 8, 2000 p. 56.

* cited by examiner

*Primary Examiner*—Jagdish N Patel
(74) *Attorney, Agent, or Firm*—Staas & Halsey LLP

(57) ABSTRACT

A computer implemented method for facilitating the procurement of goods and services, comprising requesting any one of a plurality of procurement entities, completing procurement items associated with the requested procurement entity, and recording the procurement items.

17 Claims, 8 Drawing Sheets

VIRTUAL PROCUREMENT FOLDER

This application is a divisional application of Ser. No. 09/741,823 filed Dec. 22, 2000 now abandoned.

BACKGROUND OF THE INVENTION

1. Field of the Invention

The present invention relates to procurement processes. More particularly, the present invention relates to a virtual procurement folder which stores all of the records, decisions, quotes, and other procurement information generated during a procurement process.

2. Description of the Related Art

Procurement is the process of acquiring goods and services required to sustain an organization's activities. In the public sector, for example, the individuals involved in this process generally include government employees who act as buyers, vendors who act as sellers, procurement officers who act as facilitators, and citizens who act as observers. Each of these actors has four primary goals for the procurement process: that the process be timely, efficient, value-maximizing, and fair.

FIG. 1 shows the stages and sequential flow of a procurement process according to the prior art. As shown in FIG. 1, the procurement process usually begins at requisition stage 5. A requisition is a document used by buyers within an organization to request that goods or services identified in the requisition be purchased on their behalf by a procurement officer. The procurement officer solicits the marketplace to determine which vendor or vendors can supply the goods or services described in the requisition.

Once one or more vendors are identified, the vendors are sent a solicitation document at solicitation stage 10, identifying the requirements for the goods or services supplied in the requisition document. The solicitation document invites the vendors to put a price on the goods or services. Or, alternately, the solicitation document invites the vendors to supply alternate substitute goods or services other than the ones described in the solicitation.

The identified vendors then prepare bid responses to the solicitation at bid response stage 15. Bid responses generally contain information such as a vendor's proposed price and the time to delivery of the items listed in the solicitation.

The procurement officer next evaluates all of the bid responses sent by the vendors at evaluation stage 20. The procurement officer generally scores each vendor based upon any number of pre-selected criteria, and selects a vendor to supply the requested goods or services.

The procurement officer, acting as an agent of the organization, awards the determined vendor a contractual document known an award at award stage 25. The award sets out the price of the requested goods or services. The award further details the legal obligations of the organization, acting as a buyer of the requested goods or services, and details the legal obligations of the selected vendor, acting as a seller of the requested goods or services.

After the award contract has been signed by the organization and the selected vendor, the vendor delivers the now contracted-for goods or services to the organization. When the organization receives goods, the organization makes a recording as to what is being received from the vendor, and optionally, the organization may inspect the delivered goods. Next, the awarded contracting vendor is paid. Safeguards are usually in place which make sure the vendor is authorized to be paid.

At contract management stage 30 of the procurement process, the progress of the execution of the award contract is carried out by the management of the many different documents associated with the execution of the award contract.

Existing procurement solutions to the above-described procurement process are neither timely nor efficient. For instance, current existing procurement solutions include manual paper based processes whereby each stage of the procurement process has different paper forms, and a lot of time is spent copying similar data between the forms, such as manually copying item procurement specifications from the requisition document to the solicitation document. Further, much time is wasted tracking where data originated from, what stage a procurement is in, and why particular decisions were made.

Even existing automated solutions are neither timely nor efficient. Furthermore, existing automated solutions limit users to a sequential processing of procurement documents (e.g. a requisition document must first be created, then a solicitation document must next be created, etc.) which limits the situations in which existing automated solutions may be applied.

For example, suppose an important bridge washes out, and gravel needs to be procured to fix the bridge. The Governor of the state in which the bridge is located signs an emergency declaration circumventing the normal rules of fair-play and proper vendor selection, and authorizes the state government to immediately evaluate bid responses. In this scenario, the government's preferred procurement process would circumvent the time consuming requisition and solicitation stages of the procurement process, and would instead jump immediately to the bid response stage to ultimately determine the gravel company which can deliver the needed supplies to the bridge in the most expedient manner possible. This way, the bridge may be repaired in the shortest amount of time possible. Existing automated solutions are not capable of handling this scenario because of their aforementioned sequential nature.

As a further example, suppose an organization goes through most of the stages of the procurement process (requisition, solicitation, bid response, evaluation to choose a vendor, and award) and then the chosen vendor goes out of business. The end-user of existing automated procurement systems must go back to the beginning stage (requisition) and go through each procurement stage in turn before a new vendor may be awarded a contract, even though it would be more expedient for the end-user to go directly to the bid-evaluation stage in order to select a new vendor.

Additionally, both existing manual and automated solutions create a document trail which inevitably becomes unwieldy, due to the number of documents, decisions, quotes, and other procurement information generated during a procurement process.

Therefore, a need exists for a procurement system that stores all of the records, decisions, quotes, and other procurement information generated during a procurement process as a single entity, and that allows for an end-user to jump from one procurement stage to another in a non-sequential manner.

SUMMARY OF THE INVENTION

It is an object of the present invention to store all of the records, decisions, quotes, and other procurement information generated during a procurement process as a single entity.

It is another object of the present invention to allow for an end-user to jump from one procurement stage to another in a non-sequential manner.

It is a further object of the present invention to redefine what stages are required for a particular procurement process.

It is yet another object of the present invention to have an identifier associated with a procurement entity which tracks the procurement entity as it goes through various stages and events of a procurement process.

It is another object of the present invention to allow the requesting, viewing, and/or modification of a procurement entity by its procurement identifier.

The above objects can be attained by a computer implemented method for facilitating the procurement of goods and services, comprising requesting any one of a plurality of procurement entities, completing records and events associated with the requested procurement entity, and recording said events.

The present invention treats procurement as a single entity which moves through several stages. An end-user may request to work with any procurement entity and any record or event associated with any stage of the procurement process. Moreover, end-users may modify the names and number of the stages to match their particular procurement needs. The present invention also streamlines the procurement process by removing the duplication which existing systems have by storing all of the procurement data in a single location.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

An embodiment of the present invention treats a procurement as a "need" which moves as an entity through various stages and activities before it is acquired. A procurement entity is a grouping of data typically but not limited to initially including requisition information, to which more data throughout the procurement process may be added, and upon which decisions may be made. The procurement entity may be continually tracked throughout the procurement process.

Figure 2:
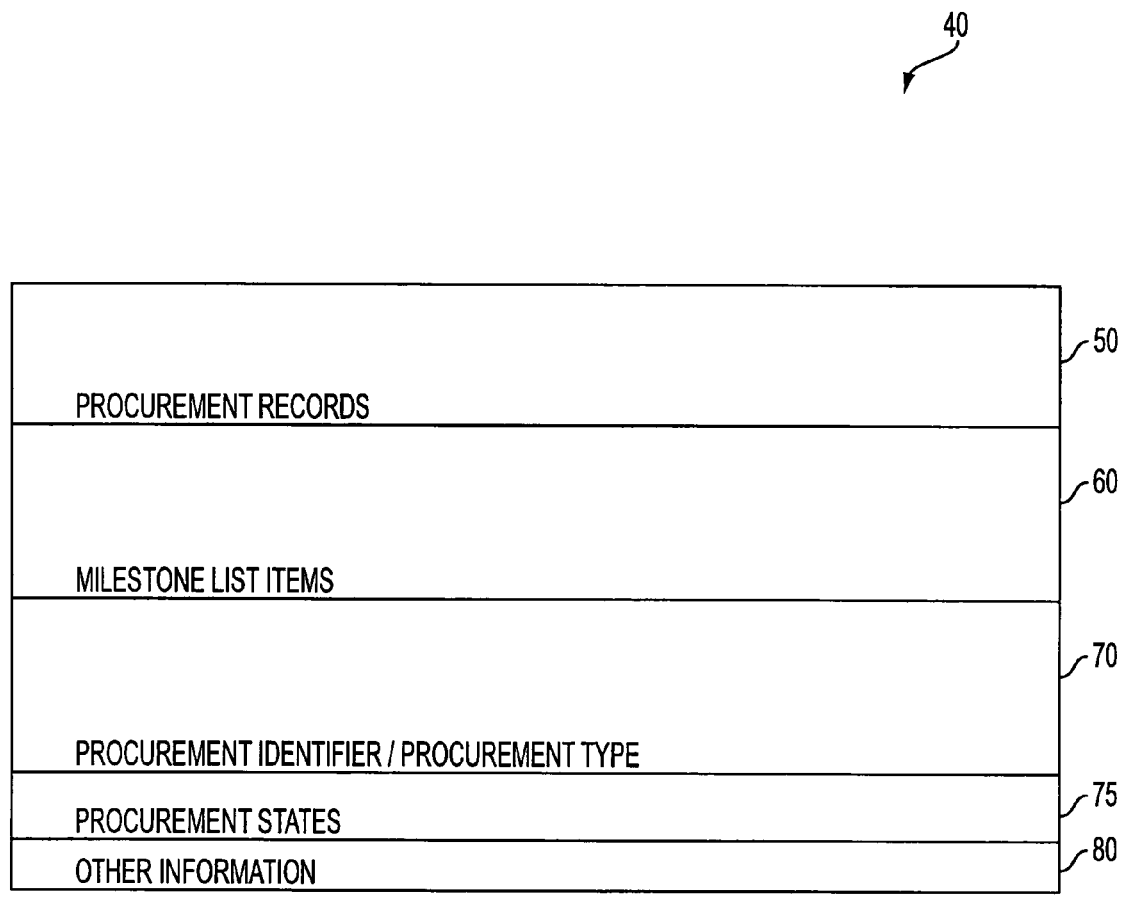
FIG. 2 shows a procurement entity database according to the present invention.

FIG. 2 shows a procurement entity database according to the present invention. Procurement entity database 40 is composed of several data-fields, including procurement records 50, milestones 60, procurement identifier 70, procurement states 75, and other information 80, all of which will be discussed below.

Procurement entity 40 is a virtual procurement folder, which allows procurement administrators to assign various procurement items, including records 50 and milestone lists 60, into logical groups. These groups then include all the information that is needed to successfully complete a particular type of procurement. A procurement type is a user defined sequence of states used in the procurement process to buy goods and/or services. There are several types of procurements, including but not limited to delivery order, price agreements, supply agreements, professional services, construction, unclassified, and contract procurements. Procurement entity 40 may be classified as any type of procurement.

User-defined rules may be linked to the procurement types. For example, the rules may include (but are not limited to) which states are valid for a particular procurement type, which documents which may be created within a particular state, and the default record types for each state.

Procurement records 50 are used to gather the information needed for the successful completion of a procurement. Procurement records 50 are created with specific types of procurements and parts of the procurement process in mind. Procurement record types include but are not limited to Requisition (RQ), Performance Evaluation (PE), Solicitation (SO), Renewal (RN), Solicitation Response (SR), Termination (TM), Evaluation (EV), Receiver (RC), Master Agreement (MA), Invoice (IN), and Purchase Order (PO).

Each type of procurement has states. States are different stages in the lifetime of a procurement. Further, each procurement type may have a different number and/or combination of states. Procurement states 75 stores the procurement states corresponding to the procurement type of a particular procurement entity.

Each stage or state that a procurement passes through requires specific types of records. For example, the requisition state generally requires RQ records, the solicitation state generally requires SO records, the bid response state generally requires SR and SO records, the evaluation state generally requires EV records, the award state generally requires MA and PO records, and the contract management state generally requires IN, RC, PE, TM, and RN records. Users may define or redefine which records are required per state for a given procurement type.

Procurement records associated with a state collect information which is specific for the part of the procurement process that the state represents. The records associated with subsequent states build on the records that were entered in the previous state. Thus, procurement records 50 may contain data associated with different procurement states.

For example, the record associated with the Requisition state collects very basic information (including but not limited to the issuer and/or the items needed), the record associated with the Solicitation state then takes the information gathered in the Requisition state and includes the information needed to successfully advertise for bids in the open market. Such information may include but is not limited to terms and conditions and/or evaluation criteria. The records in the subsequent states further build on the information. This information can vary depending on the procurement actions that take place. These may include adding vendor responses to bids, questions and responses made by vendors, evaluation worksheets, terms and conditions, and data related to the type of award.

In addition, procurement entity 40 may also contain any amendment information to any item of the procurement, and system related data such as record status, types of actions completed, acquired or needed approvals, and user notes, stored in data-field other information 80.

Each procurement entity has a unique procurement identifier 70, such as a number, icon, or alpha-numeric string. For example, a procurement number may be assigned to a group of data to denote the data is part of the same procurement entity. The procurement number may be assigned at the time a new procurement is created, usually at the requisition, although the procurement number may be assigned at any state. When a new procurement is started the record created is typically the first record in the chain for the selected procurement type, which may also be stored in data-field 70. The subsequent records that are defined as part of the procurement chain for the selected procurement type are created by the user selecting a new record action in a state viewer for the next state configured as part of the procurement chain for the selected procurement type.

The state viewer allows a user to view and edit all procurement records 50 that are associated with a particular procurement identified by procurement identifier 70. Records that are specific for a state are grouped in that states' state viewer. Users may move through the various states of procurement to view, edit, or create records that are specific to the procurement and state. This allows the user to not only view information currently on file for a past state of the procurement but the user may create records in advance that will be used in future states of the procurement. For instance, users may begin creating the criteria needed to evaluate bids from vendors in the Solicitation State before the associated Requisition record has been accepted and finalized.

Milestone list items 60 are events that should take place in order for the procurement to move through the various stages of the procurement process. Milestones provide a checklist of activities that should occur to the procurement within each particular state. Users may define which milestones list items appear in each state for a given procurement type. Milestones may be either mandatory or non-mandatory. The rules which determine this are user-configurable. Thus, users may configure their milestone list as they see fit.

Figure 1:
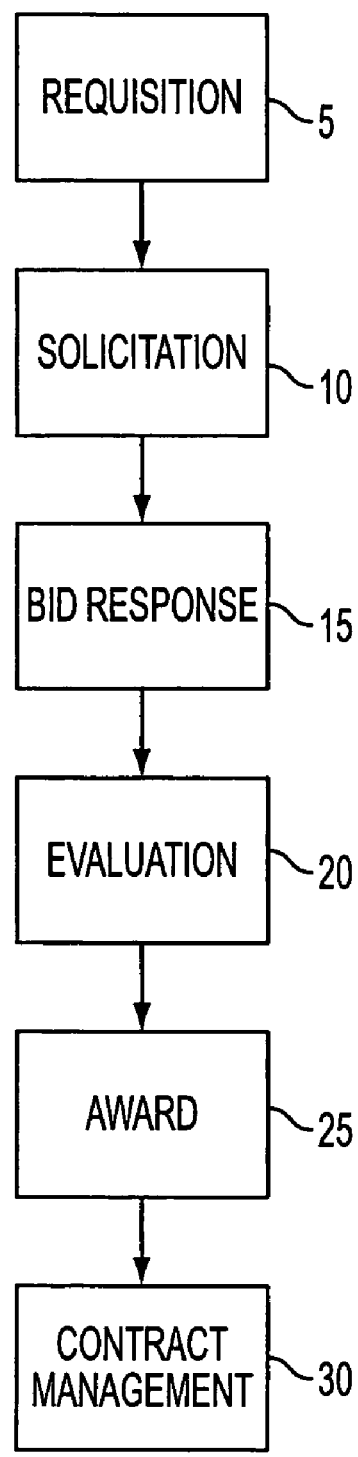
FIG. 1 shows the stages and sequential flow of a procurement process according to the prior art.
Figure 4:
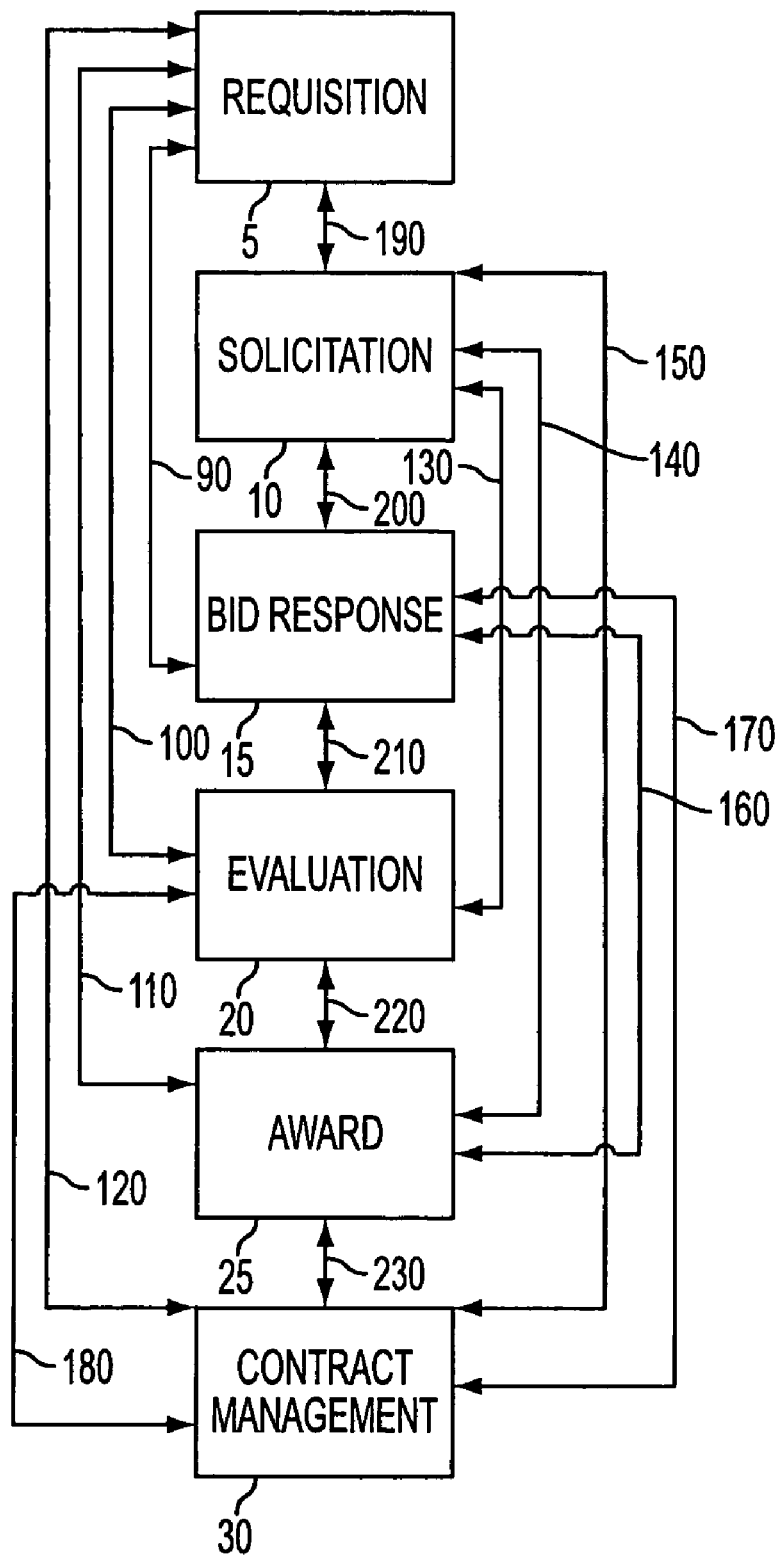
FIG. 4 shows the possible different flows of a procurement process according to the present invention.

The purpose of a state is to organize the events and actions that occur during a procurement as well as manage the components associated with a record. The procurement business may generally be divided into six states: requisition 5, solicitation 10, bid response 15, evaluation 20, award 25, and contract management 30, as shown in FIGS. 1 and 4.

Within each state there are numerous actions and milestone list items which occur. Actions are processes which are applied to procurement records within the state. Milestone list items are steps that should be or must be completed within a state. Milestone list items are non-system in nature. The state tracks which milestone list items have been completed and displays a date completed for the item, based on the current system date at the time the user marks the item completed. Some milestone list items may be mandatory while others may not. The milestone list and their associated requirements are configurable and may be established by each user.

Figure 3:
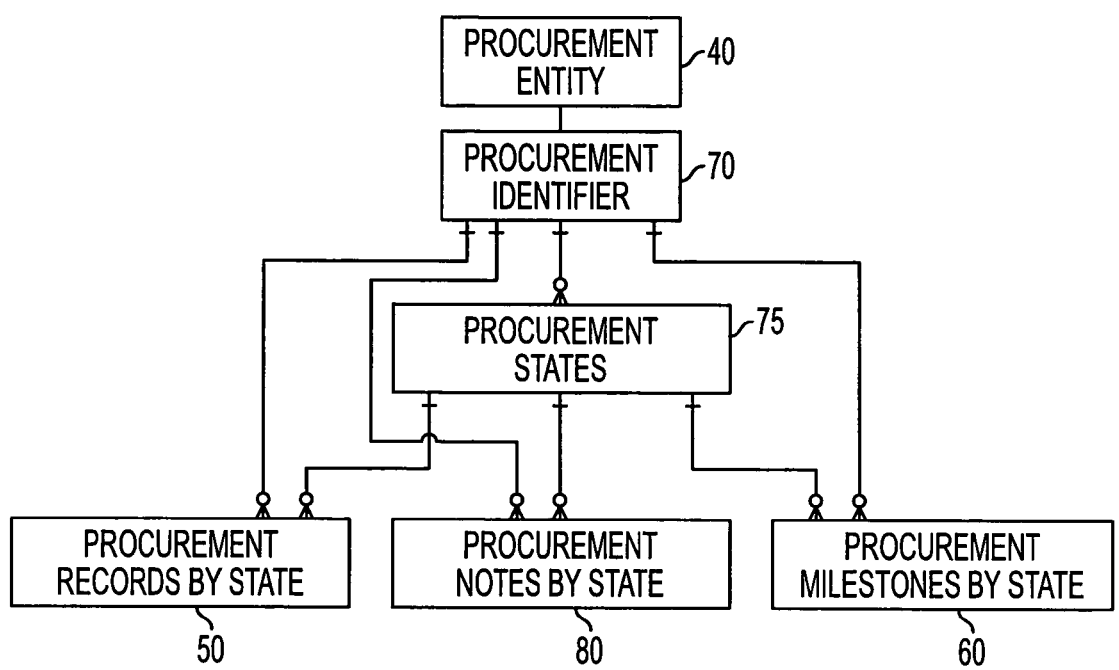
FIG. 3 shows the relationships between a procurement entity and the procurement entity data-fields of FIG. 2.

FIG. 3 shows the relationships between a procurement entity and the procurement entity data-fields of FIG. 2. Procurement entity 40 has a one-to-one relationship with procurement identifier 70. That is, procurement identifier 70 uniquely identifies a single procurement entity 40.

Procurement identifier 70 has a one-to-many relationship with procurement states 75, procurement records 50, other information 80 (including procurement notes), and milestones 60. That is, for any individual procurement identifier 70 (and thus for individual procurement entity 40), there are corresponding multiple procurement states, records, notes, and milestones.

Procurement states 75 has a one-to-many relationship with procurement records 50, other information 80 (including procurement notes), and procurement milestones 60. That is, for every individual procurement state, there are multiple corresponding records, other information (including notes), and milestones.

FIG. 4 shows the possible different flows of a procurement process according to the present invention. At the most basic level, a procurement moves from state to state, e.g., from requisition state 5 to solicitation state 10, from solicitation state 10, to bid response state 15, from bid response state 15 to evaluation state 20, from evaluation state 20 to award state 25, and from award state 25 to contract management state 30. However, it is not necessary to complete the states 5, 10, 15, 20, 25, and 30 in sequential order. Instead, any state of states 5, 10, 15, 20, 25, and 30 may be an initial state to be completed, from which any of the states 5, 10, 15, 20, 25, and 30 (not including the chosen initial state) may be a next or future state to be completed.

For instance, from requisition state 5, solicitation state 10 may be a next state as shown by arrow 190, bid response state 15 may be a next state as shown by arrow 90, evaluation state 20 may be a next state as shown by arrow 100, award state 25 may be a next state as shown by arrow 110, or contract management state 30 may be a next state as shown by arrow 120.

From solicitation state 10, requisition state 5 may be a next state as shown by arrow 190, bid response state 15 may be a next state as shown by arrow 200, evaluation state 20 may be a next state as shown by arrow 130, award state 25 may be a next state as shown by arrow 140, or contract management state 30 may be a next state as shown by arrow 150.

From bid response state 15, solicitation state 10 may be a next state as shown by arrow 200, requisition state 5 may be a next state as shown by arrow 90, evaluation state 20 may be a next state as shown by arrow 210, award state 25 may be a next state as shown by arrow 160, or contract management state 30 may be a next state as shown by arrow 170.

From evaluation state 20, bid response state 15 may be a next state as shown by arrow 210, solicitation state 10 may be a next state as shown by arrow 130, requisition state 5 may be a next state as shown by arrow 100, award state 25 may be a next state as shown by arrow 220, or contract management state 30 may be a next state as shown by arrow 180.

From award state 25, evaluation state 20 may be a next state as shown by arrow 220, bid response state 15 may be a next state as shown by arrow 160, solicitation state 10 may be a next state as shown by arrow 140, requisition state 5 may be a next state as shown by arrow 110, or contract management state 30 may be a next state as shown by arrow 230.

From contract management state 30, award state 25 may be a next state as shown by arrow 230, evaluation state 20 may be a next state as shown by arrow 180, bid response state 15 may be a next state as shown by arrow 170, solicitation state 10 may be a next state as shown by arrow 150, or requisition state 5 may be a next state as shown by arrow 120.

Thus, a procurement entity and its associated records and milestones can be accessed from within any state so that work can proceed on certain activities in future states prior to former states being completed. For example, an evaluation scorecard may be prepared in Evaluation state 20 when a requisition from requisition state 5 has not yet been accepted.

A state is deemed completed when all mandatory milestone list items have been completed and all associated records are in a final state of completion.

Because the number of states varies from user to user, the present invention permits a user to change the number of states from the six listed above, to a greater or lesser number of states. Furthermore, the present invention allows for the automatic changing from one state to another state depending upon user-defined variable rules, and further allows for a user to rename the states to suit a user's procurement needs.

Figure 5:
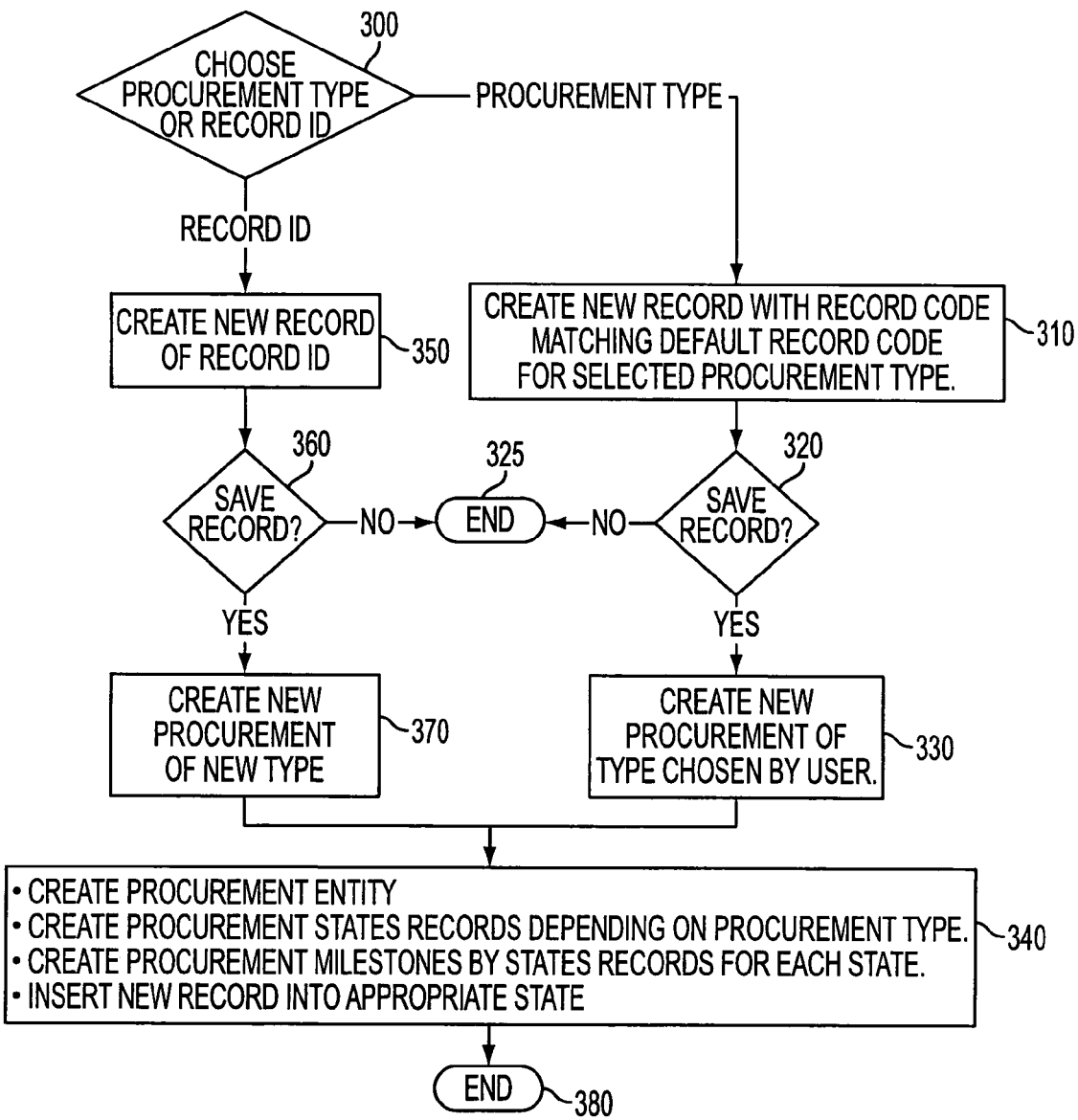
FIG. 5 shows a flowchart representing the creation of a procurement entity.

FIG. 5 shows a flowchart representing the creation of a procurement entity. At operation 300, a user is given a choice of selecting a pre-defined procurement type, or selecting a new procurement type. If the user selects a pre-defined procurement type, then a new record is created with a record identifier matching the default record identifier associated with the selected procurement type's first state at operation 310, and processing proceeds to operation 320. A record identifier is a sub-category within a record type. For example, within the record type "Purchase Order", the present invention may have record identifiers for "Simple Purchase Order", "Delivery Order", or "Service Contract".

If, on the other hand, the user selects to create a new procurement type, then a new record is created with a new record identifier at operation 350, and processing proceeds to operation 360.

At operation 320, the user is prompted to save the new record of the selected procurement type. If the user decides not to save the record, then the new procurement entity process ends at operation 325. If, on the other hand, the user decides to save the record, then a new procurement is created of the type chosen by the user at operation 330.

At operation 360, the user is prompted to save the new record of the new procurement type. If the user decides not to save the record, then the new procurement entity process ends at step 325. If, on the other hand, the user decides to save the record, then a new procurement of the new procurement type is created at operation 370.

At operation 340, a new procurement entity is created with a unique procurement identifier, procurement states are created based upon the procurement type chosen by the user, default procurement milestones are determined based upon the selected procurement type, or alternately, milestones are determined independently by a system administrator for a new procurement type, and the new record is inserted into the procurement entity into its appropriate state, which is typically the selected procurement type's first state. The new procurement entity process then terminates at operation 380.

Figure 6:
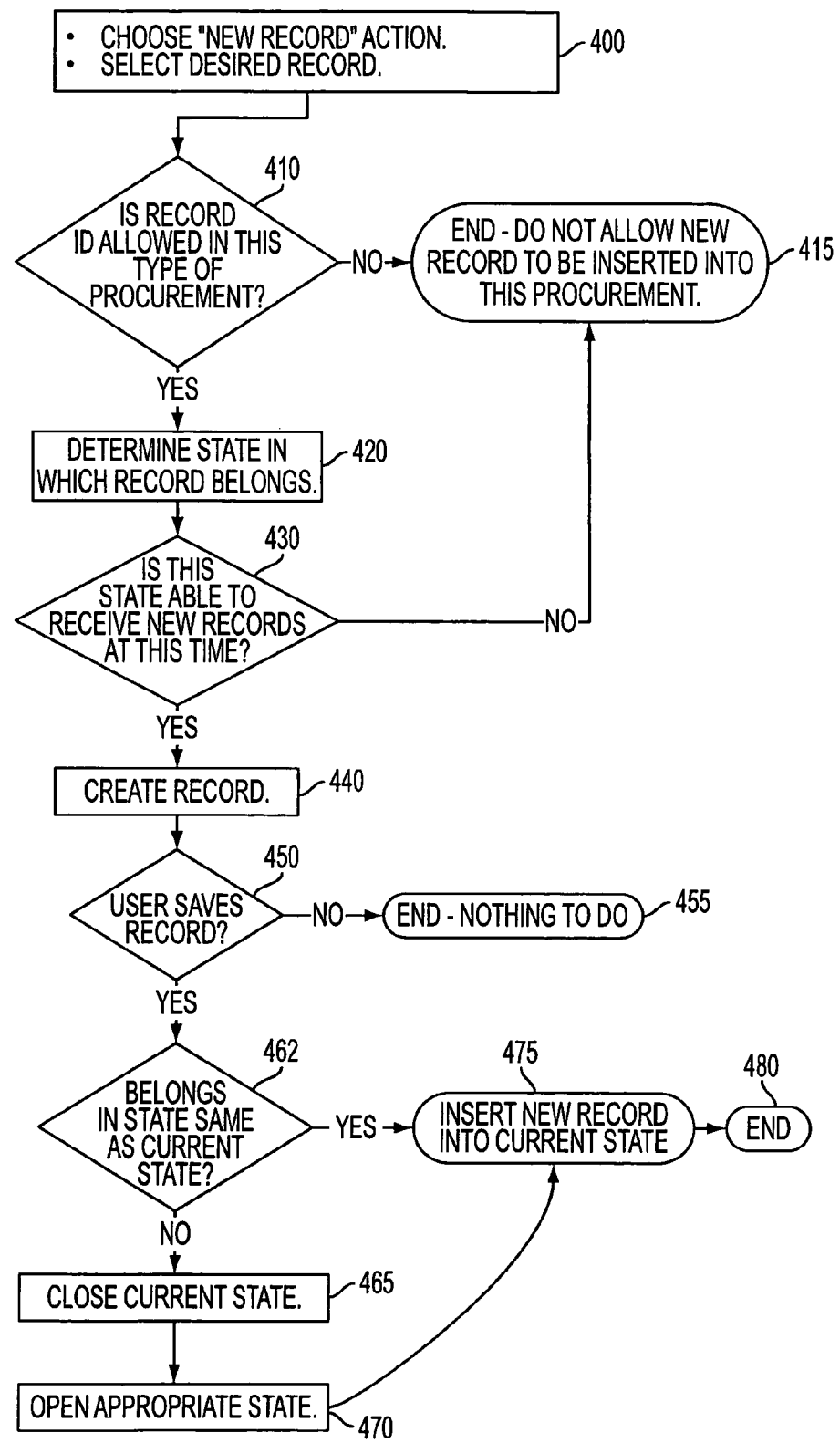
FIG. 6 shows a flowchart representing the insertion of additional procurement records into an existing procurement entity.

FIG. 6 shows a flowchart representing the insertion of additional procurement records into an existing procurement entity. At step 400, a user chooses to create a new record within a procurement by a record identifier. Operation 410 determines if a record with the selected record identifier is allowed within the current procurement entity. If the record is not of a type allowed by the current procurement entity, then the new record is prevented from being inserted into the procurement entity at operation 415, where the record insertion process ends. If, on the other hand, the record identified by the record identifier is allowed within the current procurement entity, then operation 420 determines the state in which the user selected record belongs.

Operation 430 determines if the state in which the user selected record belongs is able to receive new records. If not, then the record is prevented from being inserted into the procurement entity at operation 415, where the record insertion process ends. If, on the other hand, the state that the record is allowed in is able to accept new records, then the record is created at operation 440.

At operation 450, the user is given the option to save the record. If the user decides not to save the record, then the record insertion process ends at operation 455. If, however, the user elects to save the record, then processing proceeds to operation 462, which determines if the new record belongs in the currently opened state of the procurement entity. If the new record does not belong in the currently opened state, then the current state is closed at operation 465, the appropriate state that the record belongs in is opened at operation 470, and the new record is inserted into the current (and appropriate) state at operation 475. If, on the other hand, the new record does belong in the currently opened state, then processing proceeds from operation 462 to operation 475, where the new record is inserted into the current (and appropriate) state.

The record insertion process then ends at operation 480.

Figure 7:
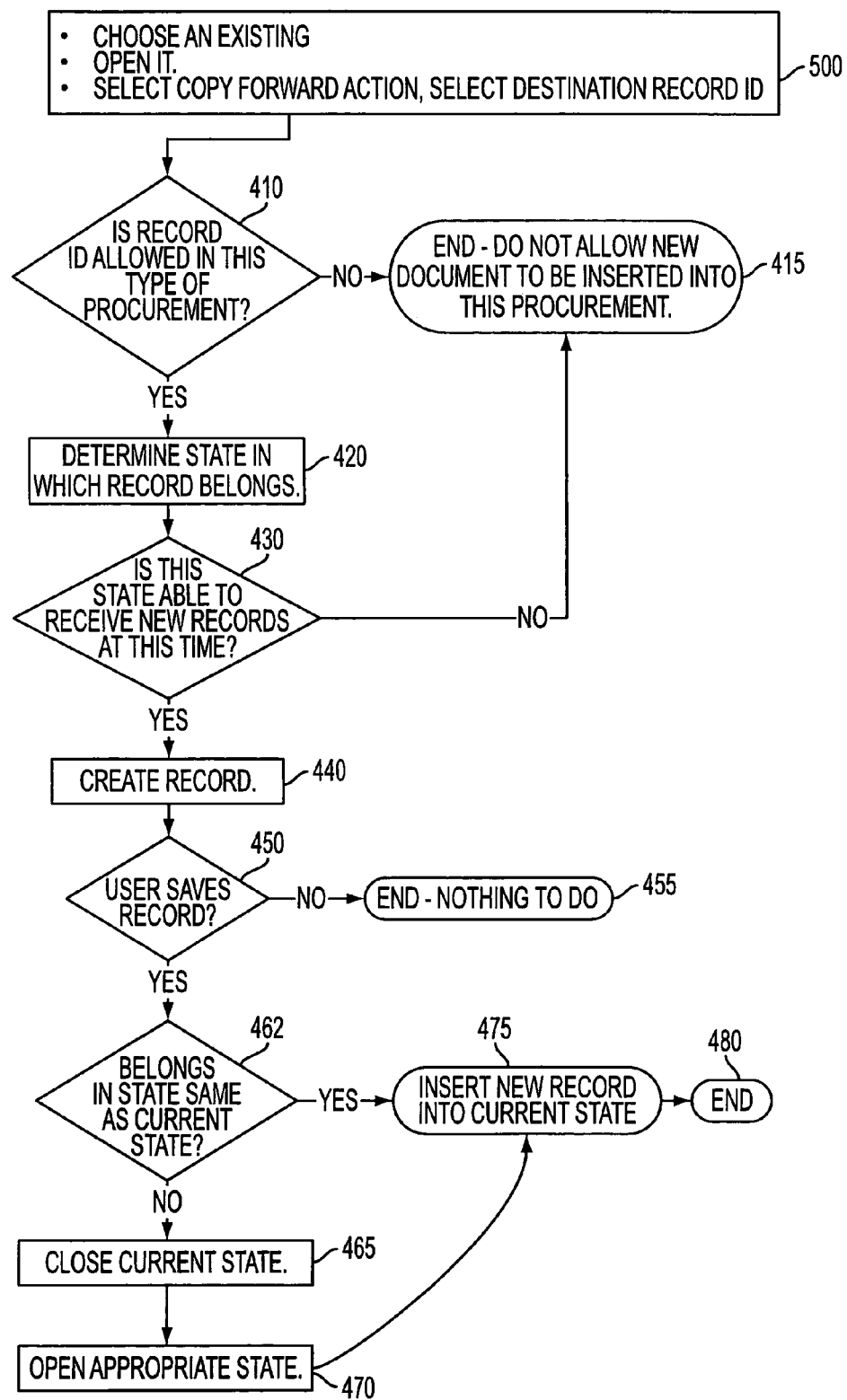
FIG. 7 shows a flowchart representing copy-forwarding of procurement records into an existing procurement entity.

FIG. 7 shows a flowchart representing copy-forwarding of procurement records into an existing procurement entity. Many records have other records which logically follow after them in the procurement process. For example, a purchase order record may immediately follow a requisition record, because a buyer may be ready to buy the items which were requisitioned. In the copy-forwarding process, a new record is created by pushing information forward from one record (e.g. a requisition record) to a record which logically follows the one record (e.g. a purchase order record).

At step 500, a user selects an existing record within a procurement entity by its record identifier. The record is opened, data from the selected record is copied into a newly created record, and the user then selects a destination record identifier for the newly created record. Operation 410 determines if a record with the selected record identifier is allowed within the current procurement entity. If the record is not of a type allowed by the current procurement entity, then the new record is prevented from being inserted into the procurement entity at step 415, where the copy-forwarding process ends. If, on the other hand, the record identified by the record identifier is allowed within the current procurement entity, then operation 420 determines the state in which the user selected record belongs.

Operation 430 determines if the state in which the user selected record belongs is able to receive new records. If not, then the record is prevented from being inserted into the procurement entity at operation 415, where the copy-forwarding process ends. If, on the other hand, the state that the record is allowed in is able to accept new records, then the record is created at operation 440.

At operation 450, the user is given the option to save the record. If the user decides not to save the record, then the copy-forwarding process ends at operation 455. If, however, the user elects to save the record, then processing proceeds to operation 462, which determines if the new record belongs in the currently opened state of the procurement entity. If the new record does not belong in the currently opened state, then the current state is closed at operation 465, the appropriate state that the record belongs in is opened at operation 470, and the new record is inserted into the current (and appropriate) state at operation 475. If, on the other hand, the new record does belong in the currently opened state, then processing proceeds from operation 462 to operation 475, where the new record is inserted into the current state.

The copy-forwarding process then ends at operation 480.

Figure 8:
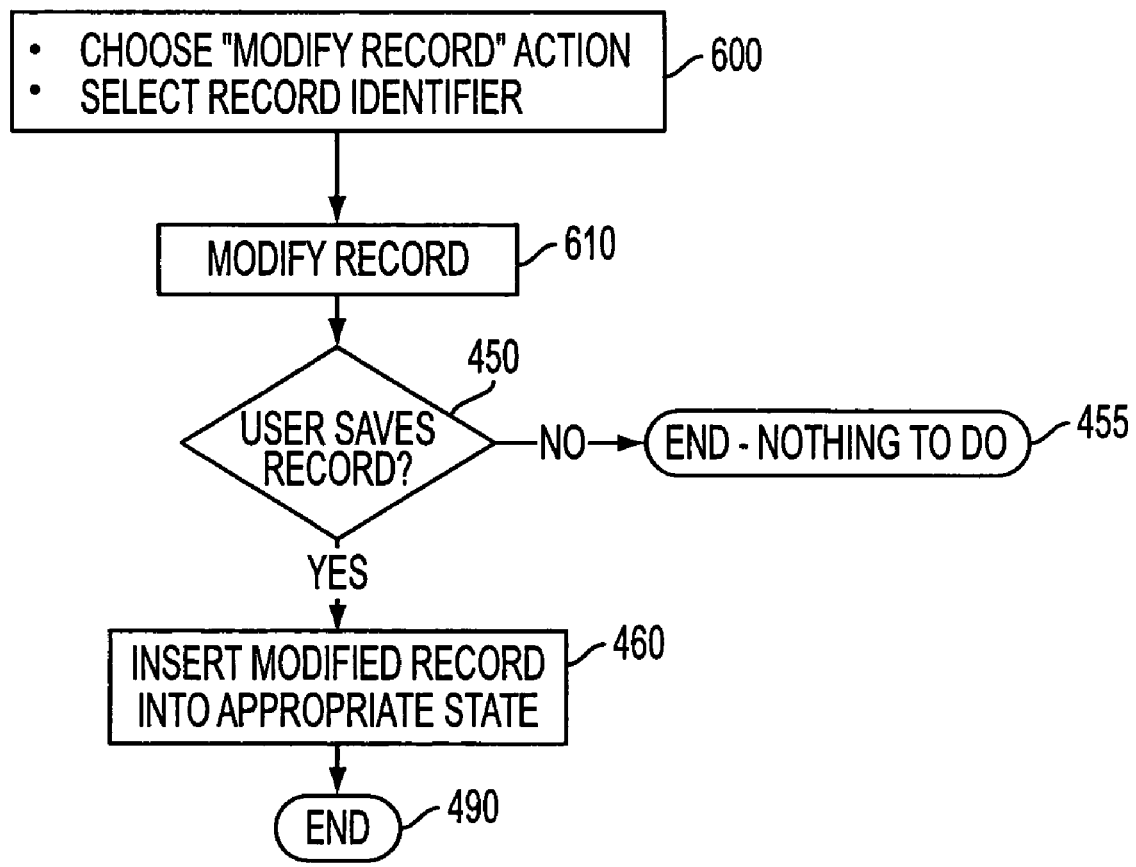
FIG. 8 shows a flowchart representing the modification of existing procurement records in a procurement entity.

FIG. 8 shows a flowchart representing the modification of existing procurement records in a procurement entity. A user may wish to modify an existing procurement record for any number of reasons, for example, to add additional information to the record, to correct errors, or to delete information from the record.

At operation 600, a user selects an existing record within a procurement entity to modify by its record identifier. The user may then modify the record at operation 610.

At operation 450, the user is given the option to save the record. If the user decides not to save the record, then the record modification process ends at operation 455. If, however, the user elects to save the record, then the modified record is inserted into its determined state within the procurement entity at operation 460, and the record modification process ends at operation 490.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A computer implemented method comprising:
   accepting a procurement type input by a user;
   creating, by a computer, a virtual procurement folder in a database based on the accepted procurement type including a plurality of data fields corresponding, respectively, to a plurality of states in a sequential flow for procuring goods and/or services;
   completing procurement items based on a new record input by the user and associated with a respective state of the plurality of states;
   identifying a current state of the plurality of states and changing the current state to the respective state if the current state is not the respective state;
   recording, by the computer, the completed procurement items in the virtual procurement folder in the database in accordance with the data field corresponding to the respective state;
   changing from the current state to a different state in accordance with user-defined rules for changing states, said different state not being a next sequential state from said current state in the sequential flow;
   completing procurement items associated with said different state; and
   recording, by the computer, the completed procurement items associated with said different state in the virtual procurement folder in the database in accordance with the data field corresponding to said different state, the method thereby allowing procurement items to be completed and recorded in the virtual procurement folder in the database for states in an order which does not follow the sequential flow.

2. The computer implemented method according to claim 1, wherein the virtual procurement folder has an associated unique procurement identifier.

3. The computer implemented method according to claim 2, wherein the virtual procurement folder may be requested by the procurement identifier.

4. The computer implemented method according to claim 1, further comprising:
   defining or redefining states to change the sequential flow.

5. The method of claim 1, wherein the changing from the current state to the different state occurs automatically based upon the user-defined rules.

6. A computer implemented method for facilitating procurement of goods and/or services, the procurement including a plurality of states representing a sequential flow for procuring the goods and/or services, the method comprising:
   accepting a procurement type input by a user;
   creating, by a computer, a virtual procurement folder in a database based on the accepted procurement type including a plurality of data fields corresponding, respectively, to the plurality of states;
   requesting procurement items associated with any respective state of the plurality of states without regard to order of the respective state in the sequential order;
   completing the requested procurement items based on a new record input by the user;
   recording, by the computer, the completed procurement items in the virtual procurement folder in the database in accordance with the data field corresponding to the respective state;
   changing to a different state from said respective state, said different state not being a next sequential state from said respective state in the sequential flow;
   requesting procurement items associated with said different state;
   completing the requested procurement items associated with said different state; and
   recording, by the computer, the completed procurement items associated with said different state in the virtual procurement folder in the database in accordance with the data field corresponding to said different state.

7. The computer implemented method for facilitating the procurement of goods and services according to claim 6 further comprising:
   defining or redefining states of the plurality of states to thereby change the sequential flow.

8. The method of claim 6, wherein the changing from the respective state to the different state occurs automatically based upon user-defined rules.

9. A method comprising:
   accepting a procurement type input by a user;
   creating, by a computer, a virtual procurement folder in a database based on the accepted procurement type having a plurality of data fields corresponding, respectively, to a plurality of states in a sequential flow for procuring goods and/or services;
   completing procurement items based on a new record input by the user and associated with a respective state, without regard to order of the respective state in the sequential flow;
   identifying a current state of the plurality of states and changing the current state to the respective state if the current state is not the respective state; and
   storing, by the computer, the completed procurement items in the virtual procurement folder in the database in accordance with the data field corresponding to the respective state, without regard to order of the respective state in the sequential flow.

10. A method as in claim 9, further comprising:
    changing to a different state from said current state after the completed procurement items associated with the respective state are stored in the virtual procurement folder in the database, said different state not being a next sequential state from said current state in the sequential flow;
    completing the procurement items associated with said different state; and
    recording the completed procurement items associated with said different state in the virtual procurement folder in the database in accordance with the data field corresponding to said different state.

11. The method of claim 10, wherein the changing from the current state to the different state occurs automatically based upon user-defined rules.

12. An apparatus comprising:
an automated procurement system comprising
a computer, comprising:
means for accepting, by the computer, a procurement type input,
means for creating a virtual procurement folder via a database based on the accepted procurement type having a plurality of data fields corresponding, respectively, to a plurality of states in a sequential flow for procuring goods and/or services,
means for completing procurement items based on a new record input and associated with a respective state, without regard to order of the respective state in the sequential flow,
means for identifying a current state of the plurality of states and changing the current state to the respective state if the current state is not the respective state, and
means for storing, by the computer, the completed procurement items in the virtual procurement folder via the database in accordance with the data field corresponding to the respective state, without regard to order of the respective state in the sequential flow.

13. The apparatus of claim 12, wherein the means for identifying the current state of the plurality of states and changing from the current state to the respective state operates automatically based upon user-defined rules.

14. A method comprising:
accepting a procurement type input by a user;
creating, by a computer, a virtual procurement folder in a database based on the accepted procurement type having a plurality of data fields corresponding, respectively, to a plurality of states in a sequential flow for procuring goods and/or services;
accepting a new record input by the user and associated with a respective state of the plurality of states;
changing to the respective state of the plurality of states, without regard to order of the respective state in the sequential flow;
completing procurement items associated with the respective state, without regard to order of the respective state in the sequential flow; and
storing, by the computer, the completed procurement items in the virtual procurement folder in the database in accordance with the data field corresponding to the respective state, without regard to order of the respective state in the sequential flow.

15. The method of claim 14, wherein the changing to the respective state of the plurality of states occurs automatically based upon user-defined rules.

16. An apparatus comprising:
a computer, comprising:
means for accepting, by the computer, a procurement type input,
means for creating a virtual procurement folder via a database based on the procurement type having a plurality of data fields corresponding, respectively, to a plurality of states in a sequential flow for procuring goods and/or services;
means for accepting a new record associated with a respective state of the plurality of states;
means for selecting the respective state of the plurality of states, without regard to order of the respective state in the sequential flow;
means for completing procurement items associated with the respective state, without regard to order of the respective state in the sequential flow; and
means for storing, by the computer, the completed procurement items in the virtual procurement folder via the database in accordance with the data field corresponding to the respective state, without regard to order of the respective state in the sequential flow.

17. The apparatus of claim 16, wherein the means for selecting the respective state of the plurality of states operates automatically based upon user-defined rules.

* * * * *

UNITED STATES PATENT AND TRADEMARK OFFICE
CERTIFICATE OF CORRECTION

PATENT NO.        : 7,734,494 B2
APPLICATION NO.   : 11/210887
DATED             : June 8, 2010
INVENTOR(S)       : Deric Knowles et al.

It is certified that error appears in the above-identified patent and that said Letters Patent is hereby corrected as shown below:

First Page Col. 2 (Other Publications), Line 12 delete "Intrenet" and insert --Internet--.

First Page Col. 2 (Other Publications), Line 14 delete "Alonie:" and insert --Alorie:--.

First Page Col. 2 (Other Publications), Line 15 delete "Eleiminate" and insert --Eliminate--.

Column 12, Line 18 delete "input," and insert --input;--.

Signed and Sealed this

Nineteenth Day of October, 2010

David J. Kappos
*Director of the United States Patent and Trademark Office*